(12) United States Patent
Tsuge et al.

(10) Patent No.: US 7,193,343 B2
(45) Date of Patent: Mar. 20, 2007

(54) ELECTRIC MOTOR

(75) Inventors: Noboru Tsuge, Kariya (JP); Toshihiro Matsuura, Hamamatsu (JP); Hideji Tani, Kariya (JP); Masafuyu Sano, Kariya (JP)

(73) Assignees: ASMO Co., Ltd., Kosai (JP); Denso Corporation, Kariya (JP)

( * ) Notice: Subject to any disclaimer, the term of this patent is extended or adjusted under 35 U.S.C. 154(b) by 0 days.

(21) Appl. No.: 11/083,709

(22) Filed: Mar. 18, 2005

(65) Prior Publication Data

US 2005/0206254 A1 Sep. 22, 2005

(30) Foreign Application Priority Data

Mar. 22, 2004 (JP) ............................. 2004-083237

(51) Int. Cl.
*H02K 11/00* (2006.01)
*H02K 23/66* (2006.01)
(52) U.S. Cl. .............................. 310/68 B; 310/156.05
(58) Field of Classification Search ............. 310/68 B, 310/67 R, 89, 90, 261, 68 R, DIG. 3
See application file for complete search history.

(56) References Cited

U.S. PATENT DOCUMENTS

| | | | | |
|---|---|---|---|---|
| 4,818,907 A | * | 4/1989 | Shirotori | 310/67 R |
| 4,982,125 A | * | 1/1991 | Shirakawa | 310/88 |
| 4,985,792 A | * | 1/1991 | Moir | 360/99.08 |
| 5,008,573 A | * | 4/1991 | Beppu et al. | 310/67 R |
| 5,334,896 A | * | 8/1994 | Ohsawa | 310/67 R |
| 5,747,908 A | * | 5/1998 | Saneshige et al. | 310/91 |
| 5,864,192 A | * | 1/1999 | Nagate et al. | 310/156.05 |
| 6,157,112 A | * | 12/2000 | Suzuki et al. | 310/269 |
| 6,169,345 B1 | * | 1/2001 | Bloch et al. | 310/67 R |
| 6,225,715 B1 | * | 5/2001 | Hoda et al. | 310/67 R |
| 6,774,599 B2 | * | 8/2004 | Ishii | 318/652 |
| 6,844,642 B2 | * | 1/2005 | Tashiro | 310/90 |
| 2001/0053040 A1 | * | 12/2001 | Sekine | 360/97.01 |

FOREIGN PATENT DOCUMENTS

| DE | 29914216 U1 | * | 11/1999 |
|---|---|---|---|
| JP | 61147760 A | * | 7/1986 |
| JP | 11-153008 | | 6/1999 |

* cited by examiner

*Primary Examiner*—Burton S. Mullins
*Assistant Examiner*—Erik Preston
(74) *Attorney, Agent, or Firm*—Workman Nydegger

(57) ABSTRACT

A stator having a stator core about which a coil is wound is secured to an aluminum frame. A magnet-embedded type rotor is rotatably accommodated inward of the stator. A circuit substrate is attached to the surface of the aluminum frame opposite to the surface to which the stator is secured. A control circuit and hall ICs for detecting the rotational position of the rotor are mounted on the circuit substrate. Detection signals of the hall ICs are received by the control circuit. The control circuit supplies a drive current to the coil of the stator in accordance with the detection signals.

19 Claims, 4 Drawing Sheets

ELECTRIC MOTOR

BACKGROUND OF THE INVENTION

The present invention relates to an electric motor that detects the rotational position of a rotor by a rotation sensor and incorporates a control circuit for controlling a drive current based on the detected rotational position.

A typical vehicle engine includes a variable valve timing device that varies the valve timing in accordance with the operating state of the engine. The variable valve timing device changes the rotation phase of a camshaft relative to a crankshaft of the engine. The variable valve timing device uses, for example, a stepping motor as a drive source (see Japanese Laid-Open Patent Publication No. 11-153008).

In general, it is difficult to control the rotation phase with high accuracy using a stepping motor and measures for preventing loss of synchronism as disclosed in the foregoing patent document are also necessary. Therefore, a variable valve timing device that uses a brushless motor instead of the stepping motor has been proposed to perform highly accurate control.

FIG. 4 shows a conventional brushless motor 51. As shown in FIG. 4, the brushless motor 51 has a substantially cup-shaped housing 52. The housing 52 accommodates a stator 53 and a magnet-embedded type rotor 54. The opening of the housing 52 is closed by an aluminum frame 55.

The stator 53 is cylindrical and includes a stator core 57, which has teeth, and a coil 59 wound about the teeth. The rotor 54 is rotatably accommodated inward of the stator 53. The rotor 54 includes a rotor core 60, which is formed by laminating disk-like core sheets. A rotary shaft 62 is inserted in a through-hole 61 formed at the center of the rotor core 60. The rotary shaft 62 is rotatably supported by bearings 63, each of which is provided in one of the housing 52 and the aluminum frame 55.

A sensor magnet 65 for detecting the position is secured to the end portion of the rotor 54. A rotation sensor 66 is located opposite to the sensor magnet 65 in the housing 52. The rotation sensor 66 detects the rotational position of the rotor 54 and sends a detection signal to a control circuit 68 provided outside the motor. The control circuit 68 supplies a drive current to the coil 59 of the stator 53 in accordance with the rotational position of the rotor 54. A rotating magnetic field is produced in the stator 53 as the drive current is supplied to the coil 59. The rotating magnetic field rotates the rotor 54.

However, since the control circuit 68 is separately provided according to the conventional brushless motor 51, the rotation sensor 66 inside the motor must be connected to the control circuit 68 with a lead wire, or the like. Thus, the cost is increased by providing wiring material, such as a lead wire, and securing member for securing the wiring material. It is also required to provide space for arranging the lead wire.

SUMMARY OF THE INVENTION

Accordingly, it is an objective of the present invention to provide a miniaturized electric motor that suppresses manufacturing cost.

To achieve the foregoing and other objectives and in accordance with the purpose of the present invention, an electric motor having a plate, a stator, a rotor, a control circuit, a circuit substrate, and a rotation sensor is provided. The plate includes a first surface and a second surface, which is opposite to the first surface. The stator is secured to the first surface of the plate, and includes a stator core and a coil wound about the stator core. The rotor is rotatably arranged inward of the stator. The rotor has a rotor core and a magnet attached to the rotor core. The control circuit supplies a drive current to the coil of the stator in accordance with the rotational position of the rotor. The circuit substrate is attached to the second surface of the plate. The rotation sensor detects the rotational position of the rotor. The control circuit and the rotation sensor are attached to the circuit substrate.

The present invention also provides an electric motor for use in a variable valve timing device for a vehicle engine. The electric motor has a plate, a stator, a rotor, a control circuit, a circuit substrate, and a rotation sensor. The plate includes a first surface and a second surface, which is opposite to the first surface. The stator is secured to the first surface of the plate. The stator includes a stator core and a coil wound about the stator core. The rotor is rotatably arranged inward of the stator. The rotor has a rotor core and a magnet attached to the rotor core. The control circuit supplies a drive current to the coil of the stator in accordance with the rotational position of the rotor. The circuit substrate is attached to the second surface of the plate. The rotation sensor detects the rotational position of the rotor. The control circuit and the rotation sensor are attached to the circuit substrate.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

An electric motor of the preferred embodiment is a brushless motor 1 used for a variable valve timing device 71 of a vehicle engine 70 and incorporates an electric driver unit (EDU) 25 for driving the brushless motor 1.

Figure 1:
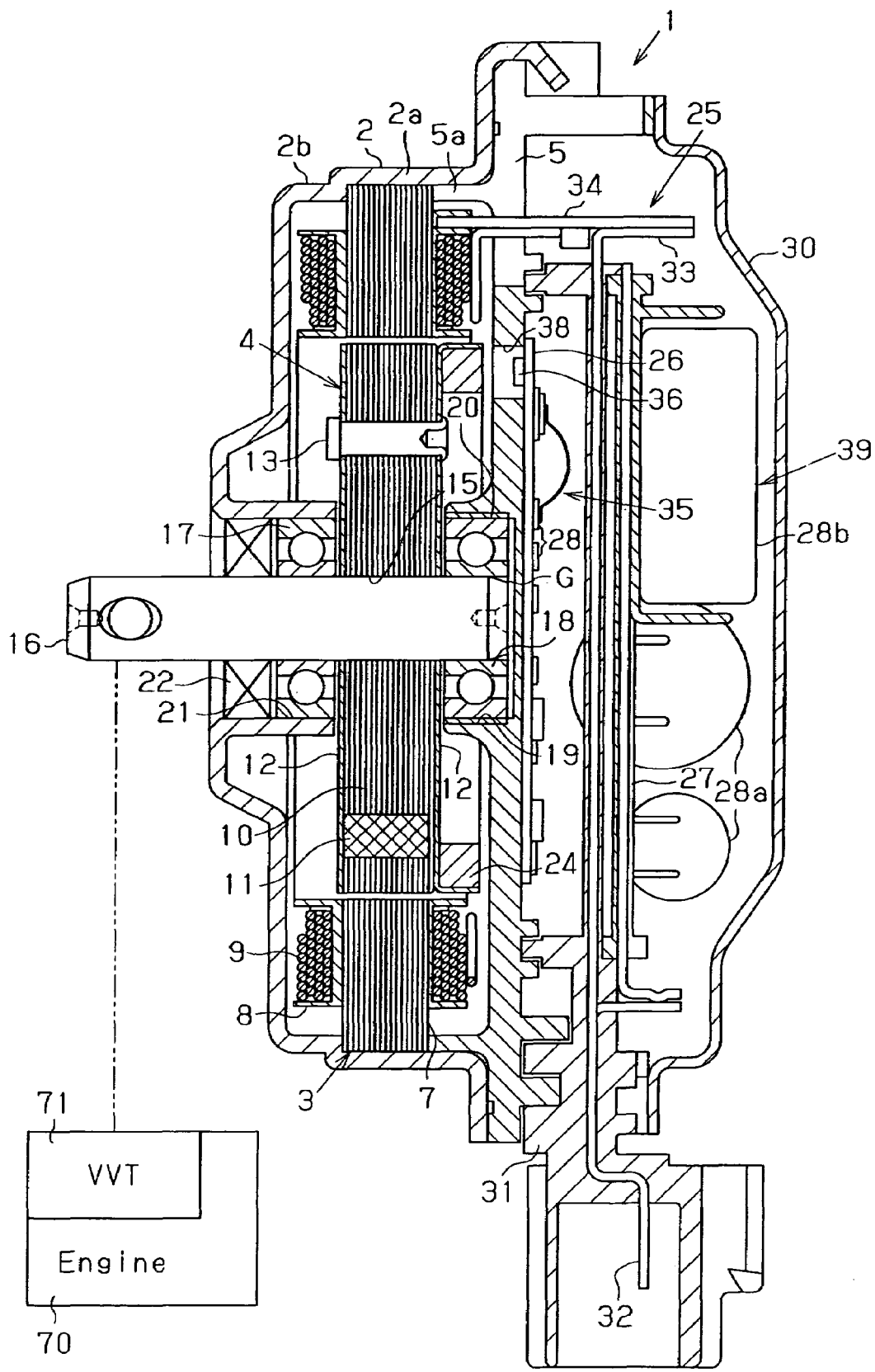
FIG. 1 is a cross-sectional view illustrating a brushless motor according to one embodiment.

As shown in FIG. 1, the brushless motor 1 has a substantially cup-shaped housing 2. The housing 2 accommodates a stator 3 and a magnet-embedded type rotor 4. The opening of the housing 2 is closed by an aluminum frame 5, that is, an aluminum plate.

The stator 3 is cylindrical and includes a stator core 7, which has teeth, and a coil 9 wound about the teeth via an insulator 8. The stator 3 generates a rotating magnetic field when a drive current is supplied to the coil 9.

The housing 2 has a large diameter portion 2a having substantially the same diameter as the stator core 7 and a small diameter portion 2b having a diameter smaller than the large diameter portion 2a. The stator 3 is accommodated in the large diameter portion 2a of the housing 2 and abuts against a step between the large diameter portion 2a and the small diameter portion 2b. The peripheral portion of the stator 3 is sandwiched between the step of the housing 2 and a projection 5a, which projects from a first surface of the aluminum frame 5. The stator 3 is thus secured.

The rotor 4 is rotatably accommodated inward of the stator 3. The rotor 4 includes a rotor core 10, which is formed by laminating disk-like core sheets. A permanent magnet 11 is inserted in a slit formed in the rotor core 10. A securing plate 12 is located on each axial end of the rotor core 10. A crimp pin 13 is inserted in through-holes formed in the rotor core 10 and the securing plates 12 to crimp the rotor core 10 and the securing plates 12. Thus, the permanent magnet 11 is secured inside the slit so that the permanent magnet 11 does not disengage from the slit formed in the rotor core 10.

A through-hole 15 is formed at the center of the rotor core 10. A rotary shaft 16 is inserted in the through-hole 15. The rotor core 10 of the preferred embodiment is directly secured to the rotary shaft 16. However, the rotor core 10 may be secured to the rotary shaft 16 via an engaging member located in between.

The rotary shaft 16 is rotatably supported by first and second bearings (ball bearings) 17, 18 each provided in one of the housing 2 and the aluminum frame 5. More specifically, an accommodating portion 19 is provided at the center portion of the aluminum frame 5. An outer ring of the bearing 18 is secured to the inner circumferential surface of the accommodating portion 19 via an elastic member 20 and an inner ring of the bearing 18 is secured to the rotary shaft 16. The bearing 18 provides a gap G between the rotary shaft 16 and the aluminum frame 5 and holds the rotary shaft 16 such that the end of the rotary shaft 16 does not abut against the aluminum frame 5. Since the elastic member 20 is located between the outer ring of the bearing 18 and the accommodating portion 19 of the aluminum frame 5, vibration of the rotor 4 is prevented from being transmitted to the aluminum frame 5.

An accommodating portion 21 is also formed at the center portion of the housing 2. An outer ring of the bearing 17 is secured to the inner circumferential surface of the accommodating portion 21 and an inner ring of the bearing 17 is secured to the rotary shaft 16. The bearing 17 rotatably holds the middle section of the rotary shaft 16. Furthermore, an oil seal 22 is provided in the accommodating portion 21 of the housing 2 on the outer side of the bearing 17. The oil seal 22 seals a gap between the accommodating portion 21 of the housing 2 and the rotary shaft 16.

An annular sensor magnet 24 is secured to the inner surface of the rotor 4 to be rotatable integrally with the rotor 4. The sensor magnet 24 is provided for detecting the rotational position of the rotor 4. The sensor magnet 24 includes north poles and south poles, which are arranged alternately at predetermined angular intervals.

According to the brushless motor 1 of the preferred embodiment, the electric driver unit (EDU) 25 for driving the motor 1 is located on a second surface of the aluminum frame 5 that is opposite to the surface (first surface) to which the stator 3 is secured. A motor cover 30 is attached to cover a circuit substrate 26 of the EDU 25 and a circuit element 28 of a power supply panel 27.

More specifically, a connector housing 31 of the EDU 25 is secured to the aluminum frame 5 in the motor cover 30. Terminals 32 are located in the connector housing 31. The terminals 32 include, for example, a power source terminal for supplying a three-phase drive current and a signal terminal for transmitting and receiving control signals to and from an ECU (not shown) for controlling the engine. A lead terminal 33, which extends from the power source terminal 32, projects outside the connector housing 31. The lead terminal 33 is connected to a power supply terminal 34 of the stator 3 through resistance welding. Furthermore, the end of the coil 9 is connected to the power supply terminal 34 of the stator 3 through fusing.

The circuit substrate 26, that is, an EDU substrate 26 formed of a ceramic substrate is secured to the aluminum frame 5. A control circuit 35 is formed on the circuit substrate 26. The rotation sensors, which are hall ICs 36 in this embodiment, are attached to positions on the circuit substrate 26 facing the sensor magnet 24. In this embodiment, three hall ICs 36 are mounted on the circuit substrate 26 about the rotary shaft 16 at predetermined angular intervals to control a three phase electromagnetic circuit.

Each hall IC 36 detects the rotational position of the rotor 4 and sends a detection signal to the control circuit 35. The hall ICs 36 of this embodiment are each accommodated in one of a plurality of through-holes 38 formed in the aluminum frame 5. Thus, the hall ICs 36 are embedded between the aluminum frame 5 and the circuit substrate 26. This suppresses increase in the axial dimension of the substrate 26 and the frame 5 due to axial projection of the hall ICs 36. This also prevents the sensitivity of the sensor from decreasing due to eddy currents produced in the aluminum frame 5, which is made of metal.

The power supply panel 27 is arranged on the upper row (right side of the connector housing 31 as viewed in FIG. 1) of the circuit substrate 26. A noise filter 39, which includes a smoothing capacitor 28a and a choke coil 28b, is formed on the power supply panel 27 beside wiring that supplies electricity. The noise filter 39 eliminates noise from a three-phase drive current supplied to the motor and suppresses generation of motor noise.

The control circuit 35 attached to the circuit substrate 26 detects the rotational position of the rotor 4 by detection signals from the hall ICs 36. The control circuit 35 generates a motor drive signal based on control signals from the ECU (signals instructing the rotational direction and speed) and the rotational position of the rotor 4. The control circuit 35 sends the motor drive signal to the ECU through the terminals 32 in the connector housing 31. Upon receipt of the motor drive signal, the ECU supplies a drive current to the power source terminal 32 of the motor 1 such that the excitation timing of the coil 9 will be appropriate. The drive current is then supplied to the coil 9 of the stator 3 through the power supply panel 27. Accordingly, a rotating magnetic field is produced in the stator 3 and the rotating magnetic field rotates the rotor 4.

The preferred embodiment provides the following advantages.

(1) The circuit substrate 26 on which the control circuit 35 is mounted is attached to the surface of the aluminum frame 5 that is opposite to the surface to which the stator 3 is secured. The rotation sensors, which are the hall ICs 36 in this embodiment, are mounted on the circuit substrate 26. Unlike the conventional brushless motor 51, the lead wire for connecting the control circuit 68 located outside the electric motor to the rotation sensor 66 located inside the electric motor is unnecessary. Thus, a space for arranging the lead wire need not be provided. The stator 3 and the magnet-embedded type rotor 4 are located on one of the securing surfaces of the aluminum frame 5 and the circuit substrate 26 is located on the other securing surface. Therefore, the circuit substrate 26 is easily mounted on the aluminum frame 5. Furthermore, the control circuit 35 is prevented from being damaged when mounting the stator 3 on the aluminum frame 5. Thus, the size of the brushless motor 1 is reduced while suppressing the manufacturing cost of the brushless motor 1.

(2) Since the aluminum frame 5 is a metal plate, heat generated by the circuit element 28 of the control circuit 35 is efficiently radiated. External force applied to the circuit substrate 26 is suppressed and the control circuit 35 is reliably protected.

(3) The circuit element 28 is mounted on a position of the circuit substrate 26 facing the end of the rotary shaft 16 with the aluminum frame 5 in between, that is, at the center portion of the circuit substrate 26 to form the control circuit 35. With this structure, the mounting surface of the circuit substrate 26 is effectively used and the motor 1 can be miniaturized.

(4) The through-holes 38 are formed in the aluminum frame 5 and the hall ICs 36 are each accommodated in one of the through-holes 38. In this case, the sensitivity of the sensor is prevented from decreasing due to eddy currents produced in the aluminum frame 5. Since the axially projecting portions of the hall ICs 36 on the circuit substrate 26 are accommodated in the through-holes 38, the motor 1 is miniaturized.

(5) The accommodating portion 19 for accommodating the bearing 18 is formed in the aluminum frame 5. Since the bearing 18 holds the end of the rotary shaft 16 such that the end of the rotary shaft 16 does not abut against the aluminum frame 5, the control circuit 35 on the circuit substrate 26 attached to the aluminum frame 5 is protected.

(6) The elastic member located between the accommodating portion 19 of the aluminum frame 5 and the outer ring of the bearing 18 suppresses rotor vibration from being transmitted to the aluminum frame 5. Thus, the control circuit 35 on the circuit substrate 26 is reliably protected.

It should be apparent to those skilled in the art that the present invention may be embodied in many other specific forms without departing from the spirit or scope of the invention. Particularly, it should be understood that the invention may be embodied in the following forms.

Figure 2:
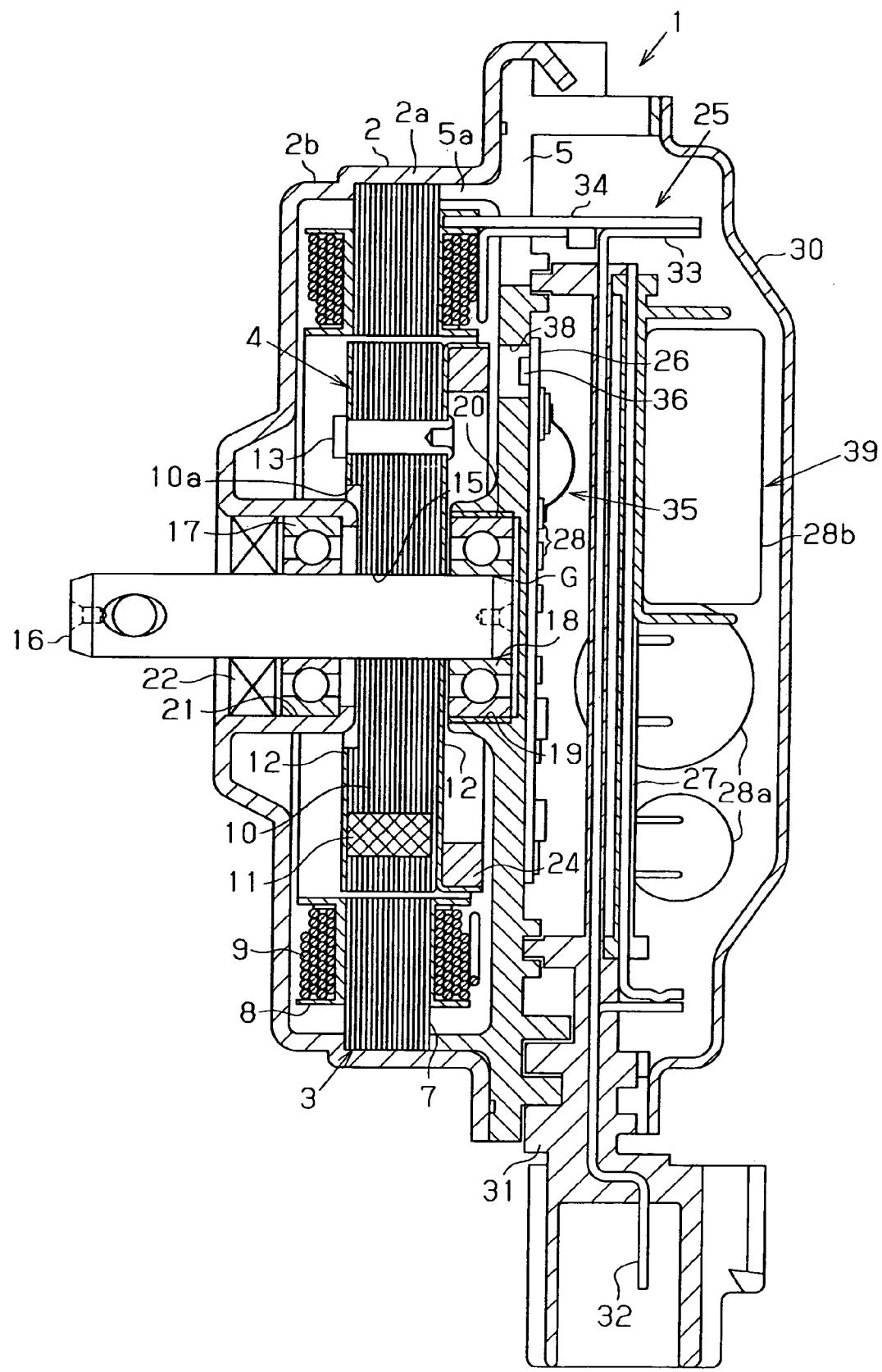
FIG. 2 is a cross-sectional view illustrating a modified brushless motor.
Figure 3:
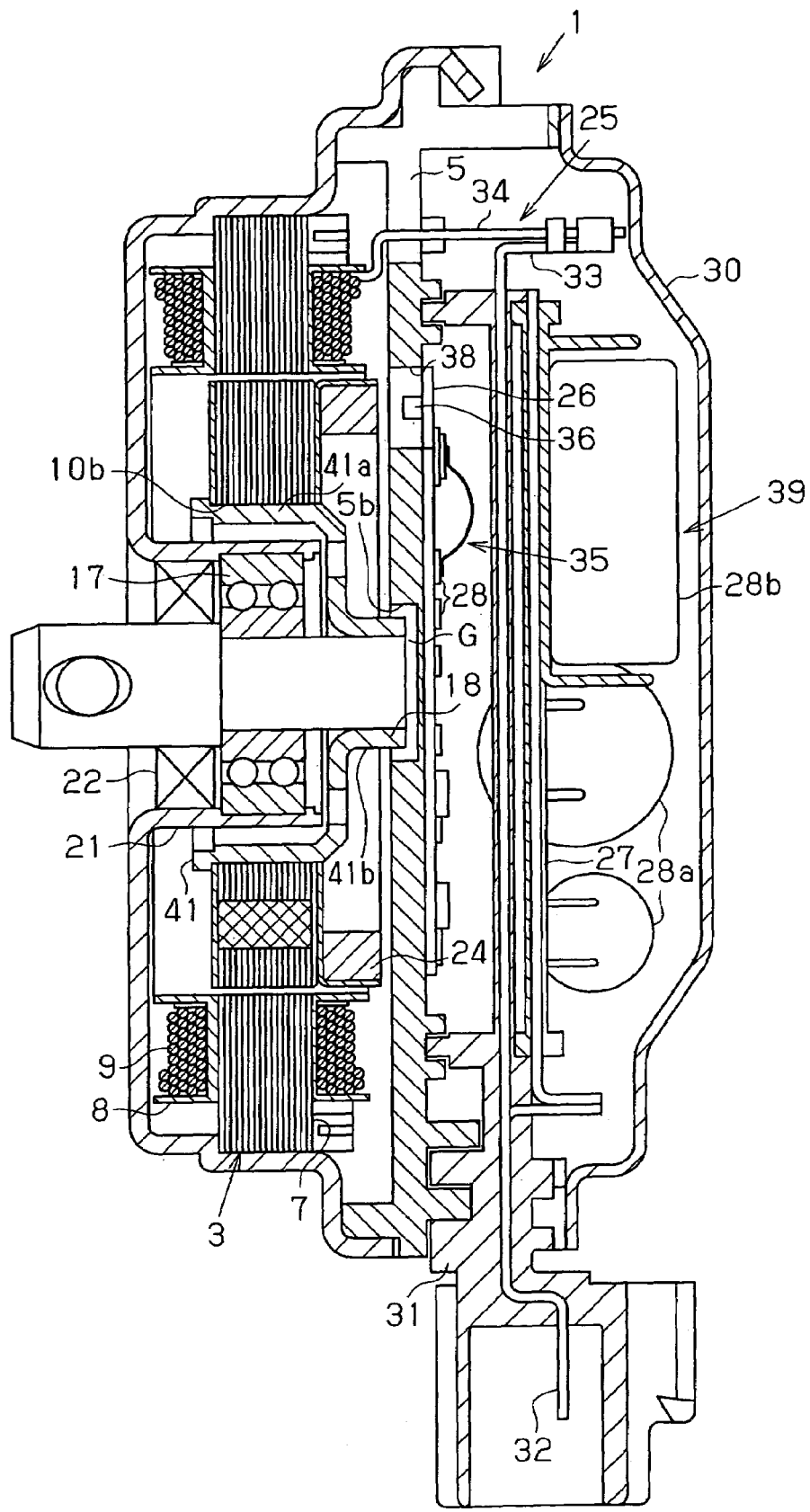
FIG. 3 is a cross-sectional view illustrating another modified brushless motor.
Figure 4:
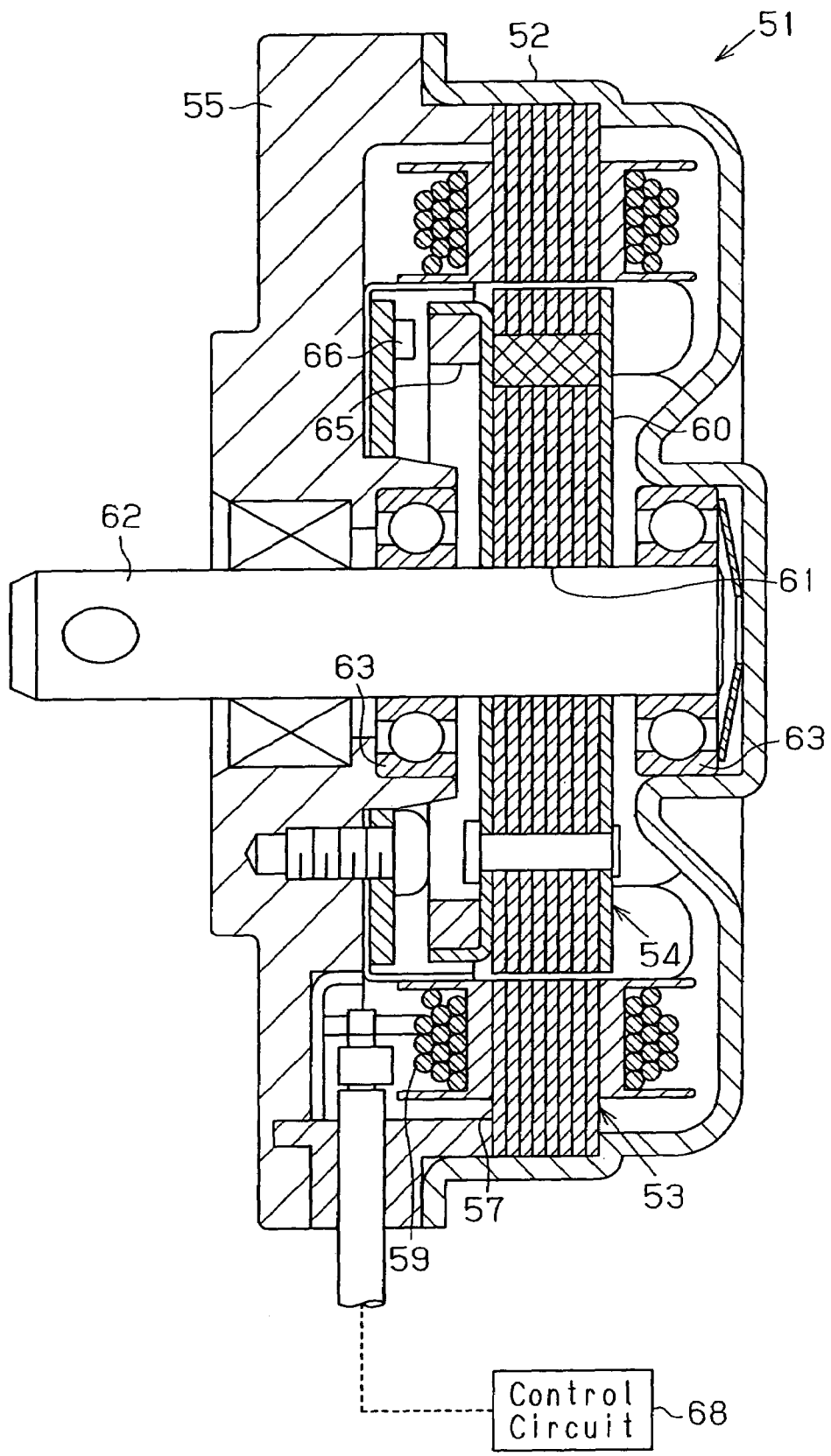
FIG. 4 is a cross-sectional view illustrating a prior art brushless motor.

The structure of the magnet-embedded type rotor 4 may be changed as shown in FIGS. 2 and 3. Like or the same reference numerals are given to those components that are like or the same as the previously preferred embodiment.

According to the brushless motor 1 shown in FIG. 2, a recess 10a is formed at the center of the outer surface of the rotor core 10. The accommodating portion 21 for the bearing 17 is inserted in the recess 10a. Inserting the bearing 17 in the recess 10a of the rotor core 10 reduces the axial dimension of the brushless motor 1. Since the distance between the bearings 17, 18 is shortened, the ends of the rotor 4 are secured within a short distance. This suppresses vibration of the rotor 4 and prevents fatigue of the control circuit 35 due to the vibration.

According to the brushless motor 1 shown in FIG. 3, a through-hole 10b is formed at the center portion of the rotor core 10 extending in the axial direction. The bearing 17 is located in the through-hole 10b. More specifically, the outer circumferential surface of a large diameter portion 41a of a coupling member 41 is fitted to the through-hole 10b of the rotor core 10 while the end of the rotary shaft 16 is fitted to the inner circumferential surface of a small diameter portion 41b of the coupling member 41. The magnet-embedded type rotor 4 is secured to the rotary shaft 16 via the coupling member 41. The accommodating portion 21 of the housing 2 is located in the large diameter portion 41a of the coupling member 41. The outer ring of the bearing 17 is secured to the inner circumferential surface of the accommodating portion 21 of the housing 2 and the inner ring of the bearing 17 is secured to the rotary shaft 16. The bearing 17 rotatably holds the rotary shaft 16. A recess 5b is formed at the center portion of the aluminum frame 5 facing the end of the rotary shaft 16 so that the end of the rotary shaft 16 does not abut against the aluminum frame 5. As described above, since the bearing 17 is located at the center of the core by securing the rotor 4 to the rotary shaft 16 via the cup-shaped coupling member 41, the axial dimension of the motor 1 is further reduced. In this case, the bearing 18 of the aluminum frame 5 is omitted. Since the aluminum frame 5 does not hold the end of the rotary shaft 16, vibration of the rotor 4 is prevented from being transmitted to the circuit substrate 26 via the aluminum frame 5. The control circuit 35 is thus reliably protected.

The gap between each through-hole 38 of the aluminum frame 5 and the corresponding hall IC 36 may be closed by a nonconductive member. The aluminum frame 5 may be replaced with a nonconductive plate. In this case, grooves are formed in the nonconductive plate and the hall ICs 36 are each embedded in one of the grooves. This reduces the axial dimension of the brushless motor 1 without decreasing the sensitivity of the sensor.

The rotor core 10, which forms the rotor 4, is a laminated core in which core sheets are laminated. However, core material made of sintered material may be used.

In the above embodiments, the hall ICs 36 are used as the rotation sensor. However, for example, a magnetic detecting element such as a magnetoresistance element may be used.

Therefore, the present examples and embodiments are to be considered as illustrative and not restrictive and the invention is not to be limited to the details given herein, but may be modified within the scope and equivalence of the appended claims.

The invention claimed is:

1. An electric motor comprising:
    a plate formed of metal, the plate including a first surface and a second surface, which is opposite to the first surface;
    a stator secured to the first surface of the plate, the stator including a stator core and a coil wound about the stator core;
    a rotor rotatably arranged inward of the stator, the rotor having a rotor core and a magnet attached to the rotor core, wherein the rotor includes a rotary shaft, which rotates integrally with the rotor core, the rotary shaft having axial ends;
    a control circuit for supplying a drive current to the coil of the stator in accordance with the rotational position of the rotor;
    a circuit substrate attached to the second surface of the plate, wherein the circuit substrate has a first substrate surface and a second substrate surface, the first substrate surface contacts the second surface of the plate, and the second substrate surface is opposite to the first surface;
    an accommodating portion formed in the plate for accommodating a rotation sensor of the electric motor; and
    said rotation sensor, for detecting the rotational position of the rotor, wherein the rotation sensor is attached to the first substrate surface while accommodated in the accommodating portion, wherein the control circuit is attached to the second substrate surface, wherein the rotation sensor sends a detection signal of the rotational position of the rotor to the control circuit, wherein the first substrate surface of the circuit substrate has a portion that faces one of the axial ends of the rotary shaft, and wherein the portion of the first substrate surface contacts the second surface of the plate.

2. The electric motor according to claim 1, wherein the electric motor includes a circuit element, which forms the control circuit, and is located on the circuit substrate opposite to the rotary shaft with the plate in between.

3. The electric motor according to claim 1, wherein the accommodating portion is a through-hole formed in the plate.

4. The electric motor according to claim 2, wherein the electric motor includes first and second bearings for supporting the rotary shaft, and a space, which extends along an axial direction of the rotary shaft, is formed between the second bearing and the plate to prevent abutment between the rotary shaft and the plate.

5. The electric motor according to claim 4, wherein an accommodating portion for accommodating the second bearing is formed in the plate, and an elastic member is located between the accommodating portion and the second bearing.

6. The electric motor according to claim 4, wherein a recess is formed in the rotor core, and part of the first bearing is inserted in the recess.

7. The electric motor according to claim 2, further comprising a housing, wherein a coupling member is fitted in the rotor core, with the rotor core being secured to the rotary shaft via the coupling member, and a single bearing for supporting the rotary shaft is located in the coupling member, the single bearing having an inner ring and an outer ring, wherein the rotor core has axial ends facing each other, and wherein the single bearing is located between the axial ends of the rotor core, wherein the housing has an accommodating portion for accommodating the single bearing, the outer ring of the bearing is secured to the accommodating portion and the inner ring of the bearing is secured to a central portion of the rotary shaft so that the rotor is rotatably supported by the single bearing.

8. The electric motor according to claim 1, wherein a permanent magnet is embedded in the rotor core of the rotor.

9. An electric motor for use in a variable valve timing device for a vehicle engine, the electric motor comprising:
a plate formed of metal, the plate including a first surface and a second surface, which is opposite to the first surface;
a stator secured to the first surface of the plate, the stator including a stator core and a coil wound about the stator core;
a rotor rotatably arranged inward of the stator, the rotor having a rotor core and a magnet attached to the rotor core, wherein the rotor includes a rotary shaft, which rotates integrally with the rotor core, the rotary shaft having axial ends;
a control circuit for supplying a drive current to the coil of the stator in accordance with the rotational position of the rotor;
a circuit substrate attached to the second surface of the plate, wherein the circuit substrate has a first substrate surface and a second substrate surface, the first substrate surface contacts the second surface of the plate, and the second substrate surface is opposite to the first surface;
an accommodating portion formed in the plate for accommodating a rotation sensor of the electric motor; and said rotation sensor, for detecting the rotational position of the rotor,-wherein the rotation sensor is attached to the first substrate surface while accommodated in the accommodating portion, wherein the control circuit is attached to the second substrate surface, wherein the rotation sensor sends a detection signal of the rotational position of the rotor to the control circuit, wherein the first substrate surface of the circuit substrate has a portion that faces one of the axial ends of the rotary shaft, and wherein the portion of the first substrate surface contacts the second surface of the plate.

10. The electric motor according to claim 9, wherein the rotor includes a rotary shaft, which rotates integrally with the rotor core, and a circuit element, which forms the control circuit, is located on the circuit substrate opposite to the rotary shaft with the plate in between.

11. The electric motor according to claim 9, wherein the accommodating portion is a through-hole formed in the plate.

12. The electric motor according to claim 10, wherein the electric motor includes first and second bearings for supporting the rotary shaft, and a space, which extends along an axial direction of the rotary shaft, is formed between the second bearing and the plate to prevent abutment between the rotary shaft and the plate.

13. The electric motor according to claim 12, wherein an accommodating portion for accommodating the second bearing is formed in the plate, and an elastic member is located between the accommodating portion and the second bearing.

14. The electric motor according to claim 12, wherein a recess is formed in the rotor core, and part of the first bearing is inserted in the recess.

15. The electric motor according to claim 10, further comprising a housing, wherein a coupling member is fitted in the rotor core, with the rotor core being secured to the rotary shaft via the coupling member, and a single bearing for supporting the rotary shaft is located in the coupling member, the single bearing having an inner ring and an outer ring, wherein the rotor core has axial ends facing each other, and wherein the single bearing is located between the axial ends of the rotor core, wherein the housing has an accommodating portion for accommodating the single bearing, the outer ring of the bearing is secured to the accommodating portion and the inner ring of the bearing is secured to a central portion of the rotary shaft so that the rotor is rotatably supported by the single bearing.

16. The electric motor according to claim 9, wherein a permenanent magnet is buried in the rotor core of the rotor.

17. The electric motor according to claim 1, wherein the rotation sensor has an end surface that is located inward of the first surface of the plate.

18. An electric motor comprising:
a plate, the plate including a first surface and a second surface, which is opposite to the first surface;
a stator secured to the first surface of the plate, the stator including a stator core and a coil wound about the stator core;
a rotor rotatably arranged inward of the stator, the rotor having a rotor core and a magnet attached to the rotor core, wherein the rotor includes a rotary shaft, which rotates integrally with the rotor core, the rotary shaft having axial ends;
a control circuit for supplying a drive current to the coil of the stator in accordance with the rotational position of the rotor;

a circuit substrate attached to the second surface of the plate, wherein the circuit substrate has a first substrate surface and a second substrate surface, the first substrate surface is attached to the second surface of the plate, and the second substrate surface is opposite to the first surface;

an accommodating portion formed in the plate for accommodating a rotation sensor of the electric motor; and said rotation sensor, for detecting the rotational position of the rotor, wherein the rotation sensor is attached to the first substrate surface while accommodated in the accommodating portion, wherein the control circuit is attached to the second substrate surface, and wherein the rotation sensor sends a detection signal of the rotational position of the rotor to the control circuit, wherein the rotation sensor has an end surface that is located inward of the first surface of the plate, wherein the first substrate surface of the circuit substrate has a portion that faces one of the axial ends of the rotary shaft, and wherein the portion of the first substrate surface contacts the second surface of the plate.

19. An electric motor comprising:

a plate formed of metal, the plate including a first surface and a second surface, which is opposite to the first surface;

a stator secured to the first surface of the plate, the stator including a stator core and a coil wound about the stator core;

a rotor rotatably arranged inward of the stator, the rotor having a rotor core and a magnet attached to the rotor core, wherein the rotor includes a rotary shaft, which rotates integrally with the rotor core, the rotary shaft having axial ends;

a control circuit for supplying a drive current to the coil of the stator in accordance with the rotational position of the rotor;

a circuit substrate formed of ceramic and attached to the second surface of the plate, wherein the circuit substrate has a first substrate surface and a second substrate surface, the first substrate surface contacts the second surface of the plate, and the second substrate surface is opposite to the first surface;

an accommodating portion formed in the plate for accommodating a rotation sensor of the electric motor; and said rotation sensor for detecting the rotational position of the rotor, wherein the rotation sensor is attached to the first substrate surface while accommodated in the accommodating portion, wherein the control circuit is attached to the second substrate surface, wherein the rotation sensor sends a detection signal of the rotational position of the rotor to the control circuit, wherein the first substrate surface of the circuit substrate has a portion that faces one of the axial ends of the rotary shaft, and wherein the portion of the first substrate surface contacts the second surface of the plate.

* * * * *